June 4, 1963 F. SOMMER 3,092,759

WIRED CIRCUIT PLATE WITH ELECTRICAL COMPONENTS

Filed Jan. 2, 1959

Inventor
Friedrich Sommer
By [signature] Att'y.

3,092,759

WIRED CIRCUIT PLATE WITH ELECTRICAL COMPONENTS

Friedrich Sommer, Munich, Germany, assignor to Siemens and Halske Aktiengesellschaft Berlin and Munich, a corporation of Germany Filed Jan. 2, 1959, Ser. No. 784,517
Claims priority, application Germany Feb. 28, 1958
3 Claims. (Cl. 317—101)

Figure 2:
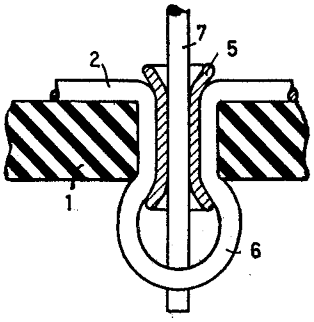

This invention is concerned with the wiring of electrical circuits, especially the wiring of electronic apparatus employed in the communication arts, and with a method of effecting such wiring.

Automation is increasingly being applied for providing the wiring of electrical apparatus. A method has become known according to which a wire is guided over a carrier provided with supports extending therefrom and is wound about the supports to effect placement thereof. The operations of the corresponding wiring device are controlled by means of a punched tape transmitter which permits within a predetermined number of possibilities selective wiring of diverse circuits.

The invention is likewise concerned with the problem of wiring circuits in simple manner. According to the invention, a wire which is to form the wiring is placed on an insulating plate in accordance with a desired wiring scheme, such plate functioning as a carrier, the wire being inserted loop-like into bores formed in the plate. The resulting wire loops form terminals for connecting structural elements such as resistors, capacitors and the like and/or function to secure the wire on the plate.

The method according to the invention distinguishes over the initially mentioned known method by the use of a simple pre-perforated plate as a carrier for the wiring without requiring any particular supporting elements. This results in a saving of material and also in simplification in the making of the carrier plates. The insertion of the wire in looped manner, in holes formed in the plate permits considerable simplification of the device for effecting the wiring since such device need not provide for changing the guide direction upon insertion of a wire as is the case with known devices which require winding a wire about supporting members. It must also be considered that the method according to the invention reduces the amount of wire since a wire loop requires less wire than is needed for winding wire about a support.

The plate serving as a carrier is suitably made of insulating material and is provided with circular holes in accordance with the wiring requirements of a desired circuit or with circular holes extending screen-like in a plurality of rows. The latter is to be preferred particularly in case the device for placing the wires is to be automatically controlled by a punched tape transmitter which may be set to the wiring possibilities of the corresponding plate.

Figure 3:
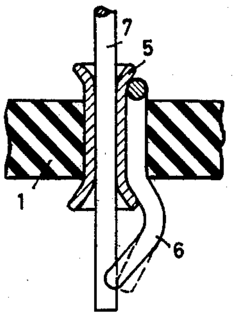

The various objects and features of the invention will appear from the following description which will be rendered with reference to the accompanying drawings. In the drawings, FIG. 1 illustrates part of a carrier plate wired and provided with structural elements in accordance with the invention;

FIG. 2 indicates how the respective loops of wires drawn through holes formed in the carrier plate may be wedged in place; and FIG. 3 illustrates the manner of wedging in place terminal parts of structural elements by means of the looped portions of wires extending through holes formed in the carrier plate.

Figure 1:
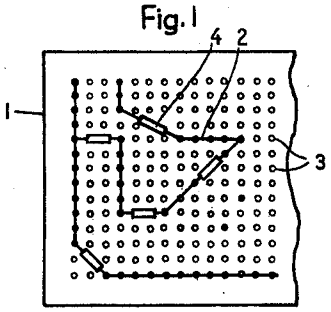

Referring now to FIG. 1, numeral 1 indicates the carrier plate which is provided with holes such as 3 formed therein, and wires such as 2 extending between predetermined holes and secured therein in loop-like manner. The plate 1 also is provided with structural elements 4 which are secured by such wiring, the respective structural elements 4 being disposed between desired holes formed in the plate.

A manner in which structural circuit elements may be connected to the wiring 2, FIG. 1, is indicated in FIGS. 2 and 3 showing as an example a component terminal 7 extending into one of the holes in the plate 1 in which is anchored one of the loops 6 of a wire 2. The holes with the wire loops disposed therein form favorable means for receiving terminal conductors belonging to circuit elements to be connected. The holes form on the one hand a kind of guide and support for the wiring and on the other hand occupy small spaces in which solder (if used) can collect providing over a relatively large surface contact with the wires and the terminal parts of the structural elements.

As shown in FIGS. 2 and 3, the respective wire loops are for the soldering advantageously carried beyond and protruding from the surface of the plate which faces away from the wiring surface, thus forming downwardly protruding wire heads which may be tinned in a common immersion operation, the solder automatically drawing into the bores containing the wire loops and thereby effecting the soldering between the looped wiring and the terminal parts belonging to a corresponding structural circuit element.

A preferred manner of wedging or anchoring the wire loops in place is indicated in FIG. 2. A bushing 5, which is made of metal, for example, a copper alloy, is pressed into the wire loop after drawing it into hole, such bushing pressing the loop against the surface of the plate adjacent the hole. The bushing may also be provided with flaring or funnel-like ends to secure it reliably in its seat in the hole. The funnel-like end of the bushing also facilitates insertion of the terminal wires of the corresponding structural elements.

As shown in FIG. 3, the use of bushings such as 5 makes it possible to effect wedging of the terminal parts or wires of the structural elements by the wire loops. FIG. 3 shows a cross-sectional view through a connecting point extending approximately perpendicularly to the plane of the wire loop which lies somewhat at the side of the bushing. The wire loop 6 is pressed by the bushing 5 against the wall of the hole. The wire loop 6 is below the bushing 5 bent laterally to such extent that it extends prior to insertion of the terminal wire 7 of a structural element approximately to a line coinciding with the axis of the bushing. The insertion of the terminal wire 7 results in bending the wire loop somewhat laterally in opposite direction, as indicated in dotted lines, thus imparting a wedging force to the terminal wire 7 and securing it and therewith the corresponding structural element securely in place.

The wire used for the wiring may be a blank wire or an insulated wire. The latter is to be preferred when there are crossing points in the circuit scheme to be wired which have to be mutually insulated. The insulation may be easily stripped at the soldering points, for example, by abrading in common at the protruding portions of the wire loops as by a brushing operation or the like.

Changes may be made within the scope and spirit of the appended claims which define what is believed to be new and desired to have protected by Letters Patent.

I claim:

1. A wired circuit plate having electrical components provided thereon on one side thereof, said components being according to a desired circuit scheme electrically interconnected by means of circuit wires looped through and deformed within holes which are preformed in said plate prior to the wiring thereof, whereby portions of said wires extending between holes are placed in firm intimate engagement with surface portions of said one side of the plate, and wherein the respective electrical components are provided with terminal wires which are extended through predetermined ones of said holes into engagement with the respective circuit wire portions looped therethrough for the purpose of soldering such terminal wires thereto, and a tubular member for clamping each of said looped wire portions in position within the corresponding hole.

2. A wired circuit plate having electrical components provided thereon on one side thereof, said components being according to a desired circuit scheme electrically interconnected by means of circuit wires looped through and deformed within holes which are preformed in said plate prior to the wiring thereof, whereby portions of said wires extending between holes are placed in firm intimate engagement with surface portions of said one side of the plate, and wherein the respective electrical components are provided with terminal wires which are extended through predetermined ones of said holes into engagement with the respective circuit wire portions looped therethrough for the purpose of soldering such terminal wires thereto, said looped wire portions extending through the corresponding holes in said plate and protruding therefrom at the other side thereof, bushing means inserted in said holes to secure said looped wire portions therein in pressure engagement with the walls of the corresponding holes, the free ends of said protruding wire portions extending along lines coinciding approximately with the axis of the respective bushing means to effect clamping engagement with terminal wires of the respective electrical components upon insertion thereof into the respective bushing means.

3. A wired circuit plate having electrical components provided thereon on one side thereof, said components being according to a desired circuit scheme electrically interconnected by means of circuit wires looped through and deformed within holes which are preformed in said plate prior to the wiring thereof, whereby portions of said wires extending between holes are placed in firm intimate engagement with surface portions of said one side of the plate, and wherein the respective electrical components are provided with terminal wires which are extended through predetermined ones of said holes into engagement with the respective circuit wire portions looped therethrough for the purpose of soldering such terminal wires thereto, and bushing means disposed in said holes to secure said looped wire portions therein in pressure engagement with the walls of the corresponding holes, said bushing means being funnel-shaped at the end thereof facing the wiring side of said plate to facilitate insertion thereinto of terminal wires of said circuit components.

References Cited in the file of this patent

UNITED STATES PATENTS

| | | |
|---|---|---|
| 1,001,054 | Lawrence | Aug. 22, 1911 |
| 1,691,877 | Alden | Nov. 13, 1928 |
| 2,039,957 | Hall | May 5, 1936 |
| 2,762,987 | Mackey | Sept. 11, 1956 |
| 2,902,629 | Little et al. | Sept. 1, 1959 |
| 2,915,678 | Frazier et al. | Dec. 1, 1959 |
| 2,923,859 | Worth et al. | Feb. 2, 1960 |
| 2,948,953 | Rayburn | Aug. 16, 1960 |
| 2,958,926 | Morison | Nov. 8, 1960 |

FOREIGN PATENTS

| | | |
|---|---|---|
| 774,979 | Great Britain | May 15, 1957 |